US008466959B2

(12) United States Patent
Kaplan et al.

(10) Patent No.: US 8,466,959 B2
(45) Date of Patent: Jun. 18, 2013

(54) VEHICLE VIDEO CONTROL SYSTEM

(76) Inventors: Alan Edward Kaplan, Morristown, NJ (US); Edward M. Ulicki, Upper Saddle River, NJ (US); Nicholas C. Korinis, II, North Bergen, NJ (US)

( * ) Notice: Subject to any disclaimer, the term of this patent is extended or adjusted under 35 U.S.C. 154(b) by 0 days.

(21) Appl. No.: 13/276,026

(22) Filed: Oct. 18, 2011

(65) Prior Publication Data
US 2012/0033033 A1  Feb. 9, 2012

Related U.S. Application Data

(63) Continuation of application No. 11/725,779, filed on Mar. 20, 2007, now abandoned.

(51) Int. Cl.
*H04N 7/18* (2006.01)
*G06F 12/00* (2006.01)
(52) U.S. Cl.
USPC .......................................... 348/120; 348/118
(58) Field of Classification Search
USPC ................................................ 348/118–120
See application file for complete search history.

(56) References Cited

U.S. PATENT DOCUMENTS

| 7,456,596 | B2 * | 11/2008 | Goodall et al. | 318/568.12 |
| 7,576,639 | B2 * | 8/2009 | Boyles et al. | 340/435 |
| 2002/0163582 | A1 * | 11/2002 | Gruber et al. | 348/218.1 |
| 2005/0007483 | A1 * | 1/2005 | Zimmermann et al. | 348/335 |
| 2007/0135984 | A1 * | 6/2007 | Breed et al. | 701/45 |
| 2007/0206945 | A1 * | 9/2007 | DeLorme et al. | 396/332 |
| 2007/0216136 | A1 * | 9/2007 | Dietz | 280/477 |
| 2007/0219654 | A1 * | 9/2007 | Frink et al. | 700/91 |

* cited by examiner

*Primary Examiner* — Zarni Maung
(74) *Attorney, Agent, or Firm* — Schenck Price Smith & King LLP

(57) ABSTRACT

A vehicle video control system is provided comprising a video camera unit having a wide angle (preferably a fisheye) lens mounted atop a column, wherein the column is attached to a manned or robotic vehicle, and an operator control unit in communication with the video camera unit. A continuous video image produced by the video camera unit is transmitted to the operator control unit. Such vehicle video control system provides a vehicle operator with an approximately hemispherical view from above the vehicle, providing the human operator with a continuous view of most of the area surrounding the vehicle. This video control system eliminates the burden of video camera control during simultaneous operation of the vehicle using the present system.

9 Claims, 1 Drawing Sheet

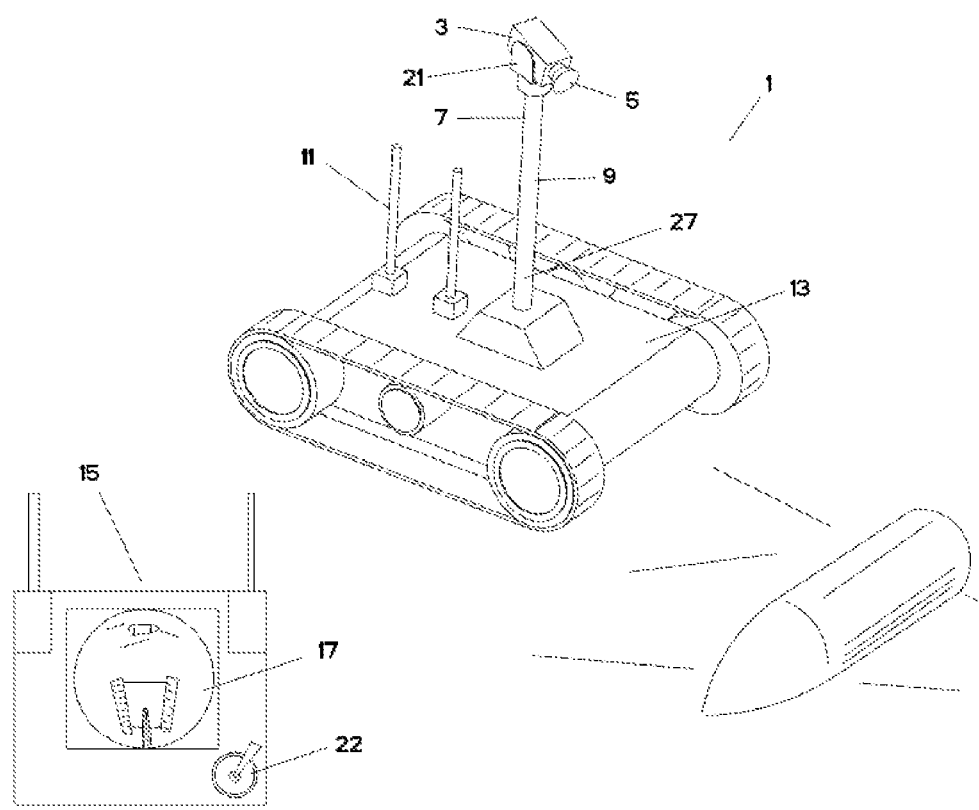

VEHICLE VIDEO CONTROL SYSTEM

CROSS REFERENCE TO A RELATED APPLICATIONS

This is a continuation patent application of co-pending application Ser. No. 11/725,779, filed Mar. 20, 2007, the contents of which are incorporated herein by reference.

FIELD OF THE INVENTION

A video control system for vehicles, including robotic vehicles, is provided. In particular, a vehicle video control system, comprised of a video camera unit having a wide angle (preferably fisheye) lens mounted atop a column, wherein the column is attached to a vehicle, preferably a robotic vehicle, and an operator control unit in communication with the video camera unit, is provided. Such video control system provides a vehicle operator with an approximately hemispherical view from above the vehicle, providing the human operator with a continuous view of most of the area surrounding the vehicle.

BACKGROUND OF THE INVENTION

Remotely controlled robotic vehicles are now used in various applications, in many cases to replace the need for placing humans in dangerous and/or difficult positions. For example, the U.S. military now uses remotely controlled robotic vehicles, such as the PacBot™ and Talon™ robots, having camera systems mounted thereon, for operator observation of the immediate surroundings of the robots, and for bomb detection and disposal. The utilization of such remotely controlled robotic vehicles enables human operators to remain at safe distances from potentially hazardous environments, while simultaneously being able to observe the immediate surroundings of the robotic vehicle.

It has been observed that while it is easy to drive by observing a remotely controlled vehicle directly in its environment, it is remarkably difficult to drive one by observing a video display connected to a camera that looks straight ahead of the remotely controlled vehicle. This is particularly true if there isn't a visual clue, such as a line in a road to refer to when driving. It is also very difficult to drive through obstacles that may interfere with the vehicles motion, such as a narrow doorway.

It is an object of the present invention to provide a system capable of providing a remote operating view of a vehicle, i.e., a view of the vehicle path via a video display, which approximates the view that an operator who is observing the vehicle directly would have, rather than through a conventional video camera and display, would have. Although the view may be slightly distorted in such a system, it is easy for a human to mentally compensate for this distortion, and therefore easy to drive the vehicle from this novel video image.

SUMMARY OF THE INVENTION

In order to achieve the object of the present invention described above, the present inventors earnestly endeavored to provide a video control system for vehicles, such as remotely controlled robotic vehicles, wherein the human operator is provided with a relative full view of the area surrounding the vehicle without the need to simultaneously control a video system/video camera.

In accordance with said object, in a first embodiment of the present invention, the present inventors provide a vehicle video control system comprising:

a video camera having a wide angle lens, said video camera adjustably disposed at a first end of a column;

a communication means in communication with the video camera, said communication means disposed upon the vehicle or said column; and an operator control unit in communication with the communication means.

Preferably, the communication means is in wireless communication with the video camera. However, the communication means may perform satisfactorily via a wired connection to the video camera. The operator can view the video image, produced by the video camera and transmitted to the operator control unit by the communication means, while controlling the vehicle. Preferably, the video camera at a downward angle, most preferably within 30° and 60°.

In a second embodiment of the present invention, the vehicle video control system of the first embodiment above is provided, wherein the video camera has a fisheye lens, or a lens having a very wide angle view, such that when viewing the video image, the operator is provided with an essentially hemispherical view from above the vehicle, or at least a very wide panoramic view of the area surrounding the vehicle.

In a third embodiment of the present invention, the vehicle video control system of the first embodiment is provided, wherein the video camera is adjustably disposed upon the column, such that the video camera may be adjusted by the operator to provide varied views of the area surrounding the vehicle.

In a fourth embodiment of the present invention, the vehicle video control system of the third embodiment of the present invention is provided, wherein the video camera further comprises a camera control means to enable remote adjustment of the video camera, such that an operator may adjust the attitude (disposition) of the camera upon the column. This enables an operator to adjust the viewing angle of the video camera, and hence the video image produced by the video camera, remotely.

In a fifth embodiment of the present invention, the vehicle video control system of the first embodiment of the present invention is provided, further comprising:

an operator control unit in communication with the communication means, wherein the operator control system comprises a receiver capable of receiving data concerning the video image produced by the video camera; and a user video display means in communication with the receiver.

Preferably, the operator control unit is in wireless communication with the communication means, via a wireless receiver. However, alternatively, the operator control unit may be in wired communication with the communication means.

In a sixth embodiment of the present invention, the vehicle video control system of the fourth embodiment of the present invention is provided, further comprising:

(a) an operator control unit in communication with the communication means, wherein the operator control unit comprises:

a receiver/transmitter capable of receiving data concerning the video image produced by the video camera, and transmitting command data concerning control of the camera control means;

(b) a user video display means in communication with the receiver/transmitter; and (c) a user control means in communication with the receiver/transmitter and operator control unit capable of relaying user commands to the camera control means, including commands to the camera control means to automatically adjust the video camera in the direction of travel of the robotic vehicle.

In a seventh embodiment of the present invention, the vehicle video control system of the first embodiment is provided, further comprising a remotely controlled robotic vehicle disposed at a second end of the column, said second end of the column opposite the first end of the column. The column may be adjustably disposed upon the remotely controlled robotic vehicle, such that the column may be tilted/turned in any desired angle.

BRIEF DESCRIPTION OF THE DRAWINGS

FIG. 1 is a perspective view of the vehicle video control system of the present invention, wherein the vehicle video control system is attached to a remotely controlled robotic vehicle, and the vehicle video control system is in wireless communication with the operator control unit.

DETAILED DESCRIPTION OF THE INVENTION

As illustrated in FIG. 1, the vehicle video control system 1 comprises a video camera 3 having a wide angle lens 5. Preferably, the wide angle lens 5 is a fisheye lens, which provides an approximately hemispherical, i.e., half of a sphere, view of the area surrounding the robotic vehicle. This type of video image provides the operator with a view of the area adjacent the front and sides of the robotic vehicle 13.

The video camera 3 is adjustably disposed at a first end 7 of a column 9. A wireless communication means 11 is in communication with the video camera 3. The wireless communication means 11 may be disposed upon a vehicle, such as a robotic vehicle 13, or upon the column 9. An operator control unit 15 is in wireless communication with the wireless communication means 11.

The human operator of the operator control unit 15 can view the video image, produced by the video camera 3 and wirelessly transmitted to the operator control unit 15 by the wireless communication means 11, while controlling the remotely controlled robotic vehicle 13. The video image is displayed to the operator on a video display means 17 disposed on, or in communication with, the operator control unit 15.

As the video image provides an approximately hemispherical view of the area surrounding the robotic vehicle 13, the operator need not perform any command or control functions with regards to the video camera 3, but instead can focus all hand-eye coordinated movements on control of the robotic vehicle. Specifically, the human operator can control the orientation of the video camera 3 via an operator control means 22, such as a joystick as illustrated in FIG. 1.

If the video camera 3 further has a camera control means 21, the operator control unit 15 comprises a receiver/transmitter, preferably wireless, capable of receiving data concerning the video image produced by the video camera, as well as transmitting command data concerning control of the camera control means 21, to control movement of the video camera 3.

As discussed in the Summary of the Invention above, the receiver/transmitter, operator control unit, communication means, etc. are preferably in wireless communication. However, the receiver/transmitter, operator control unit, communication means, etc., may be in wired communication as well. In particular, if the vehicle video control system of the present invention is utilized in a manned vehicle, wherein the vehicle is controlled by a driver disposed within the vehicle via the vehicle video control system, a wired version of the vehicle video control system is satisfactory. For example, armored military vehicles, with limited driver viewing capabilities, may utilize the vehicle video control system of the present invention to safely operate the vehicle during movement from within the safe confines of the armored vehicle.

Although specific embodiments of the present invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A vehicle video control system comprising:
   a video camera having a wide angle lens, said video camera adjustably disposed upon a vehicle such that the view captured by said video camera includes a raw vehicle periphery view including at least a view of at least a portion of the vehicle and a view of the surroundings adjacent to at least said view of at least a portion of the vehicle;
   a communication link;
   a vehicle control unit in communication with said communication link capable of receiving control commands and controlling said vehicle; and
   an operator control unit in communication with said communication link capable of receiving said view captured by said video camera and transmitting control commands to said vehicle control unit.

2. The vehicle video control system of claim 1, wherein the video camera comprises a fisheye lens, or a lens having a very wide angle view, such that when viewing the video image, the operator is provided with an essentially hemispherical view from above of the vehicle, or at least a very wide panoramic view of the area surrounding the vehicle.

3. The vehicle video control system of claim 1, further comprising a video camera control unit in communication with said communication link capable of receiving control commands and controlling said video camera, wherein the operator control unit is capable of transmitting control commands to said video camera control unit such that the video camera may be adjusted by the operator to provide varied views of the area surrounding the vehicle.

4. The vehicle video control system of claim 3, wherein the operator may adjust the attitude (disposition) of the camera upon the vehicle through control commands.

5. The vehicle video control system of claim 4, wherein the operator control unit in communication with the communication link further comprises:
   a receiver/transmitter capable of receiving data concerning the video image produced by the video camera, and transmitting command data concerning control of the camera control unit;
   a user video display in communication with the receiver/transmitter; and
   said operator control unit in communication with said receiver/transmitter wherein said operator control unit is capable of relaying user commands to the camera control unit, including commands to the camera control unit to automatically adjust the video camera such that its forward view is in the direction of travel of the vehicle.

6. The vehicle video control system of claim 1,
   wherein the operator control unit further comprises a receiver capable of receiving data concerning the video image produced by the video camera and a display to display such video image to the user.

7. The vehicle video control system of claim 6, wherein the operator control unit is in wireless communication with the communication means, via a wireless receiver.

8. The vehicle video control system of claim 1, further comprising a remotely controlled vehicle disposed at a second end of the column, said second end of the column opposite the first end of the column.

9. The vehicle video control system of claim 1, wherein said communication link is wireless.

* * * * *